(12) United States Patent
Zhao et al.

(10) Patent No.: US 11,797,091 B2
(45) Date of Patent: Oct. 24, 2023

(54) COMPUTING DEVICE WITH HAPTIC TRACKPAD

(71) Applicant: Microsoft Technology Licensing, LLC, Redmond, WA (US)

(72) Inventors: Tianyu Zhao, Kirkland, WA (US); Anteneh Detamo, Lynnwood, WA (US); Colin Roman Donahue, Kirkland, WA (US); Thomas Joseph Longo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/357,765

(22) Filed: Jun. 24, 2021

(65) Prior Publication Data
US 2022/0413613 A1    Dec. 29, 2022

(51) Int. Cl.
*G06F 3/01* (2006.01)
*G06F 3/0354* (2013.01)
(Continued)

(52) U.S. Cl.
CPC .......... *G06F 3/016* (2013.01); *G06F 3/03547* (2013.01); *G06F 3/0488* (2013.01); *G06F 3/041662* (2019.05); *G06F 2203/0338* (2013.01)

(58) Field of Classification Search
CPC ................ G06F 3/016; G06F 3/03547; G06F 3/041662; G06F 3/0488; G06F 2203/0338; G06F 1/1616; G06F 3/041; G06F 1/1643
See application file for complete search history.

(56) References Cited

U.S. PATENT DOCUMENTS 6,216,988 B1 * 4/2001 Hsu ...................... G06F 1/1616
                                                                 248/118.1
7,592,999 B2    9/2009 Rosenberg et al.
(Continued)

FOREIGN PATENT DOCUMENTS

EP            2254025 A2    11/2010
JP        2002082753 A *     3/2002
(Continued)

OTHER PUBLICATIONS

Tkachenko, Sergey, "The List of Touch Gestures for Windows 10", Retrieved from: https://winaero.com/list-touch-gestures-windows-10/, Jul. 9, 2017, 7 Pages.

(Continued)

*Primary Examiner* — Roberto Borja
(74) *Attorney, Agent, or Firm* — Alleman Hall Creasman & Tuttle LLP

(57) ABSTRACT

Computing devices and methods for producing vibrations in computing devices are disclosed. In one example, a computing device comprises a chassis that includes a trackpad comprising a printed circuit board. A haptic actuator assembly comprises at least one conductive coil formed on or affixed to the printed circuit board, and at least one magnet rigidly affixed to the chassis. The magnet is spaced from and not mechanically coupled to the at least one conductive coil. A memory stores instructions executable by a processor to receive a haptic event requests, determine that the trackpad is not in use, and at least on condition of receiving the haptic event request and determining that the trackpad is not in use, cause a driver signal to be sent to the conductive coil(s) to cause the at least one magnet to produce user-perceptible vibrations in the chassis beyond the trackpad.

20 Claims, 9 Drawing Sheets

(51) Int. Cl.
*G06F 3/041* (2006.01)
*G06F 3/0488* (2022.01)

(56) References Cited

U.S. PATENT DOCUMENTS

| | | | |
|---|---|---|---|
| 8,232,969 B2 | 7/2012 | Grant et al. | |
| 9,886,090 B2* | 2/2018 | Silvanto | G06F 3/016 |
| 10,276,004 B2 | 4/2019 | Cruz-hernandez et al. | |
| 10,372,217 B2 | 8/2019 | Birnbaum et al. | |
| 10,466,792 B2 | 11/2019 | Cruz-hernandez et al. | |
| 10,564,839 B2 | 2/2020 | Rosenberg et al. | |
| 10,586,431 B2 | 3/2020 | Rank et al. | |
| 10,649,529 B1 | 5/2020 | Nekimken et al. | |
| 2002/0033795 A1* | 3/2002 | Shahoian | G06F 3/03547 |
| | | | 345/156 |
| 2002/0149561 A1* | 10/2002 | Fukumoto | G06F 3/04886 |
| | | | 345/156 |
| 2009/0009350 A1* | 1/2009 | Novak | G06F 1/169 |
| | | | 340/815.42 |
| 2010/0134361 A1* | 6/2010 | Nakano | H01Q 1/2275 |
| | | | 343/702 |
| 2012/0229401 A1* | 9/2012 | Birnbaum | G06F 3/016 |
| | | | 345/173 |
| 2013/0249849 A1* | 9/2013 | Wong | G06F 1/3231 |
| | | | 345/174 |
| 2014/0082490 A1* | 3/2014 | Jung | G06F 3/04886 |
| | | | 715/702 |
| 2014/0189408 A1* | 7/2014 | Gough | G06F 1/3271 |
| | | | 713/324 |
| 2015/0160773 A1 | 6/2015 | Bernstein et al. | |
| 2016/0011664 A1* | 1/2016 | Silvanto | G06F 3/03547 |
| | | | 345/156 |
| 2018/0164910 A1* | 6/2018 | Ent | G06F 3/018 |
| 2018/0284905 A1* | 10/2018 | Hewett | G06F 1/1662 |
| 2020/0004337 A1 | 1/2020 | Hendren et al. | |
| 2020/0103972 A1 | 4/2020 | Amin-shahidi et al. | |

FOREIGN PATENT DOCUMENTS

| | | | | |
|---|---|---|---|---|
| WO | 2019173781 A1 | 9/2019 | | |
| WO | WO-2019173781 A1 * | 9/2019 | | G06F 3/016 |

OTHER PUBLICATIONS

Adel, et al., "Design and Development of an Electromagnetic-Based Haptic Interface", Published in: 2018 IEEE/RSJ International Conference on Intelligent Robots and Systems (IROS), Oct. 1, 2018, 8 Pages.

"International Search Report and Written Opinion Issued in PCT Application No. PCT/US22/029520", dated Aug. 30, 2022, 14 Pages.

* cited by examiner

COMPUTING DEVICE WITH HAPTIC TRACKPAD

BACKGROUND

Some computing devices include a trackpad for receiving user inputs. In some of these devices, the trackpad is physically coupled to a moveable mass that is configured to generate vibrations in the trackpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to methods and computing devices for utilizing a haptic actuator to produce vibrations in a chassis of a computing device. In some examples, a computing device comprises a chassis that includes a trackpad, with the trackpad comprising a printed circuit board. A haptic actuator assembly comprises at least one conductive coil formed on or affixed to the printed circuit board of the trackpad, and at least one magnet rigidly affixed to the chassis of the computing device, the at least one magnet spaced from and not mechanically coupled to the at least one conductive coil. The computing device further includes a processor and a memory storing instructions executable by the processor to receive a haptic event request and determine that the trackpad is not in use. At least on condition of receiving the haptic event request and determining that the trackpad is not in use, the instructions cause a driver signal to be sent to the at least one conductive coil to cause the at least one magnet to produce user-perceptible vibrations in the chassis beyond the trackpad.

DETAILED DESCRIPTION

Figure 1:
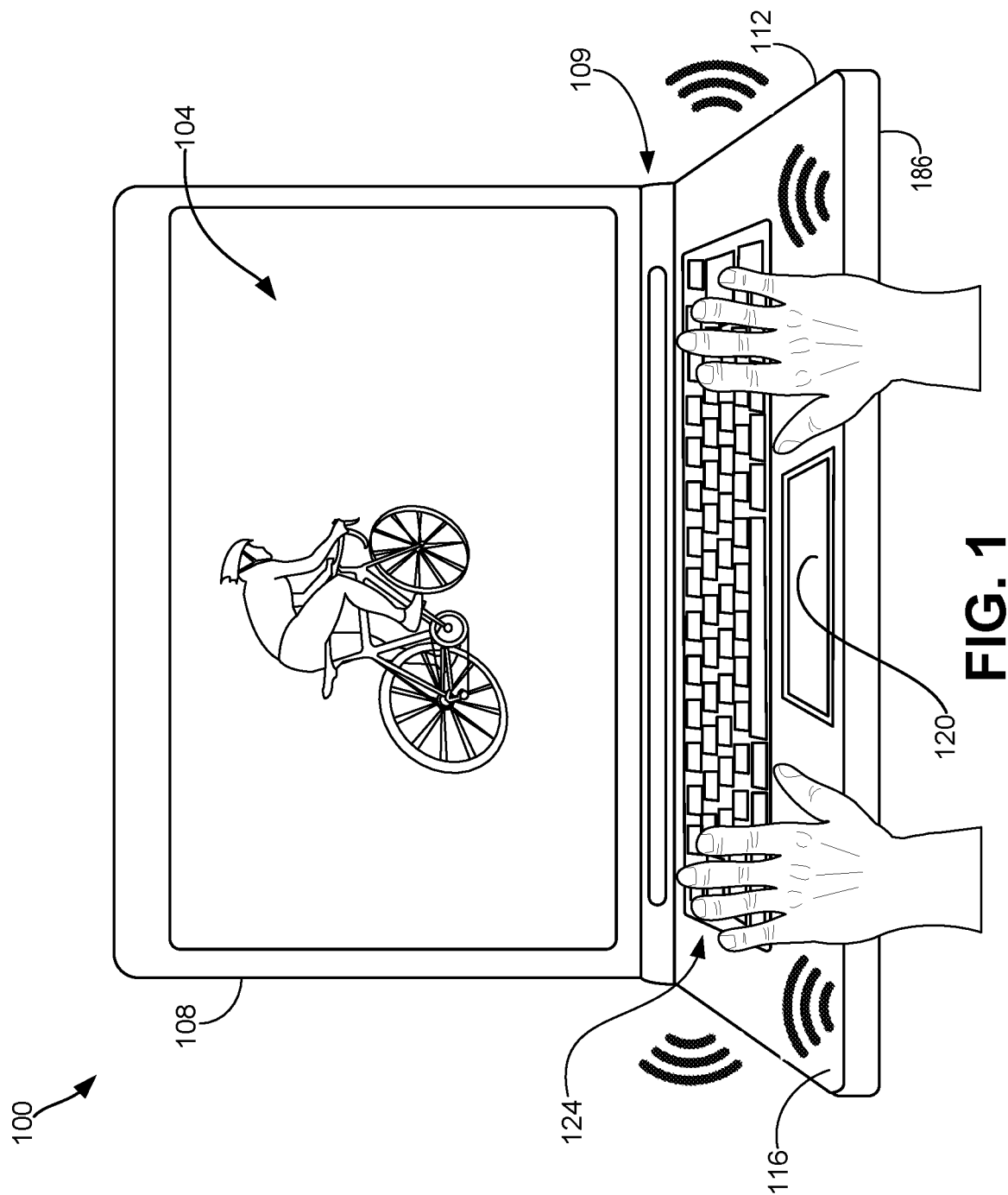
FIG. 1 shows one example of a computing device according to examples of the present disclosure.
Figure 2:
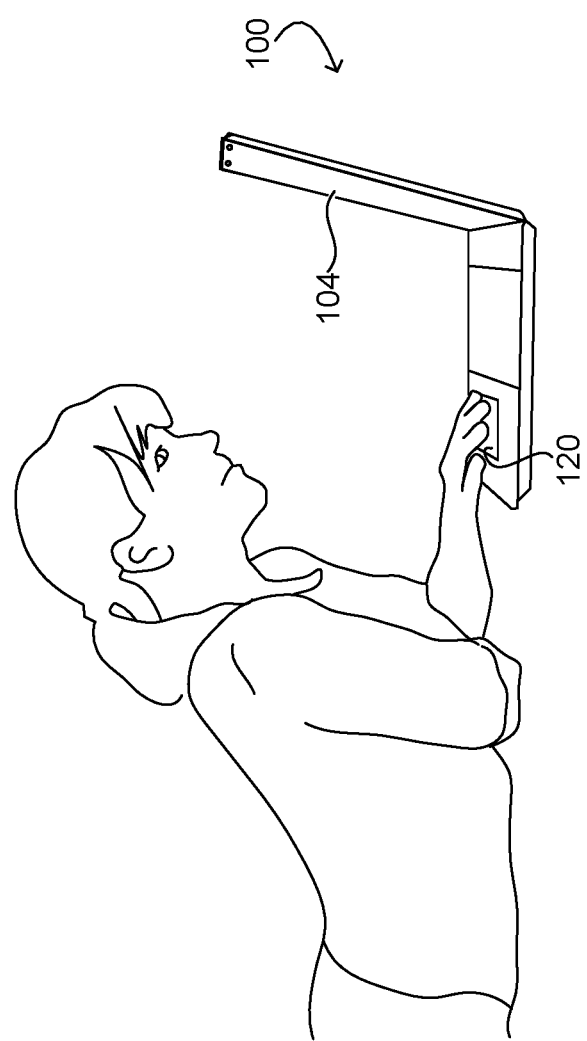
FIG. 2 shows a user interacting with the computing device of FIG. 1

Some computing devices include a trackpad for receiving user inputs. In some of these devices, the trackpad is physically coupled to a moveable mass of a haptic component that is configured to generate vibrations in the trackpad. For example, in some devices one or more linear resonant actuators (LRAs) are mechanically coupled to the trackpad and configured to vibrate the trackpad to provide haptic feedback to a user. However, providing supplemental haptic components in addition to the trackpad increases material costs and occupies additional packaging space within the structure containing the trackpad, such as a laptop housing, thereby undesirably increasing the housing thickness.

Additionally, in some examples it may be desirable to provide haptic feedback that is felt by a user in portions of the computing device outside of the trackpad. Trackpads that are mechanically coupled to a haptic component, such as one or more LRAs, eccentric rotating mass motors, or other haptic components, often utilize spacers or other dampening components between the trackpad and the housing in which the trackpad is mounted. These intervening components dampen forces and dissipate the energy produced by the haptic components affixed to the trackpad. Accordingly, the energy from the haptic component movements that is transferred to other structures beyond the trackpad is reduced, making user perception of haptic vibrations in such other structures more challenging. Additionally, providing haptic feedback to a user via such other structures by actuating the trackpad's haptic components while the user is interacting with the trackpad can disrupt the user's engagement with the trackpad and possibly confuse the user with respect to the purpose or intention of the haptic feedback.

Accordingly, and as described in more detail below, configurations of the present disclosure provide computing devices and methods for effectively producing user-perceptible vibrations beyond the device trackpad. Computing devices of the present disclosure utilize trackpads and associated haptic actuator assemblies that include one or more magnets rigidly affixed to the chassis of the computing device, to thereby effectively and efficiently transfer vibrational energy produced by the magnet(s) to the chassis to generate user-perceptible vibrations in the chassis. These configurations also reduce component costs and device space requirements. Additionally, methods of the present disclosure prioritize haptic events to selectively generate such user-perceptible vibrations in a manner that avoids user confusion and disruption with trackpad engagements.

With reference now to FIGS. 1-8 and 10, an example computing device 100 in the form of a laptop computer is illustrated. In other examples, aspects of the present disclosure can be implemented in tablet computing devices, foldable computing devices including multiple touch screens, wearable and other mobile computing devices, and any other type of computing device that utilizes a trackpad.

Computing device 100 includes a touch screen display 104 on a display substrate 108 that is rotatably coupled at a hinge 109 to a chassis 112. The chassis 112 includes a user interaction surface 116 that comprises a trackpad 120 and keyboard 124, and an opposing rear cover 186. In different examples a user provides touch inputs to the trackpad 120 by touching the trackpad with one or more digits of the user's hand (see, for example, FIG. 2). Similarly, a user may provide touch screen inputs via the touch screen display 104 by touching or placing near the display one or more digits of the user's hand and/or an input device, such as a stylus. As described in more detail below, and in one potential advantage of the present disclosure, a haptic actuator assembly associated with the trackpad 120 and the chassis 112 is configured to produce user-perceptible vibrations in the chassis beyond the trackpad and in the touch screen display 104.

Trackpad 120 is configured to detect the position and movement of a user's finger(s) and/or thumb and translate such position/movement to a relative position on the touch screen display 104. In some examples, the trackpad 120 is a mutual capacitance trackpad. In these examples, touch inputs are identified by sampling capacitance between a driving electrode and a sensing electrode. Driving electrodes are arranged in an array within the trackpad 120. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode.

Detecting this current also includes detecting the current flow into various sensing electrodes that results from the increased capacitive coupling between the driving electrodes and the sensing electrodes caused by the finger or other conductive object providing the touch input. In other examples, the principles of the present disclosure may be utilized with trackpads employing other touch detection technologies, including but not limited to self-capacitance and projected capacitance touch detection.

Similarly, touch screen display 104 can utilize a capacitive sensing subsystem having a plurality of driving electrodes and a plurality of intersecting sensing electrodes that form sensing nodes. The presence of a finger or input device on or near the touch screen display 104 is detected by measuring changes to capacitance at the sensing node(s) that are touched or near the object. In other examples, touch screen display 104 can utilize other touch sensing technologies, including but not limited to self-capacitance and projected capacitance touch detection.

Figure 3:
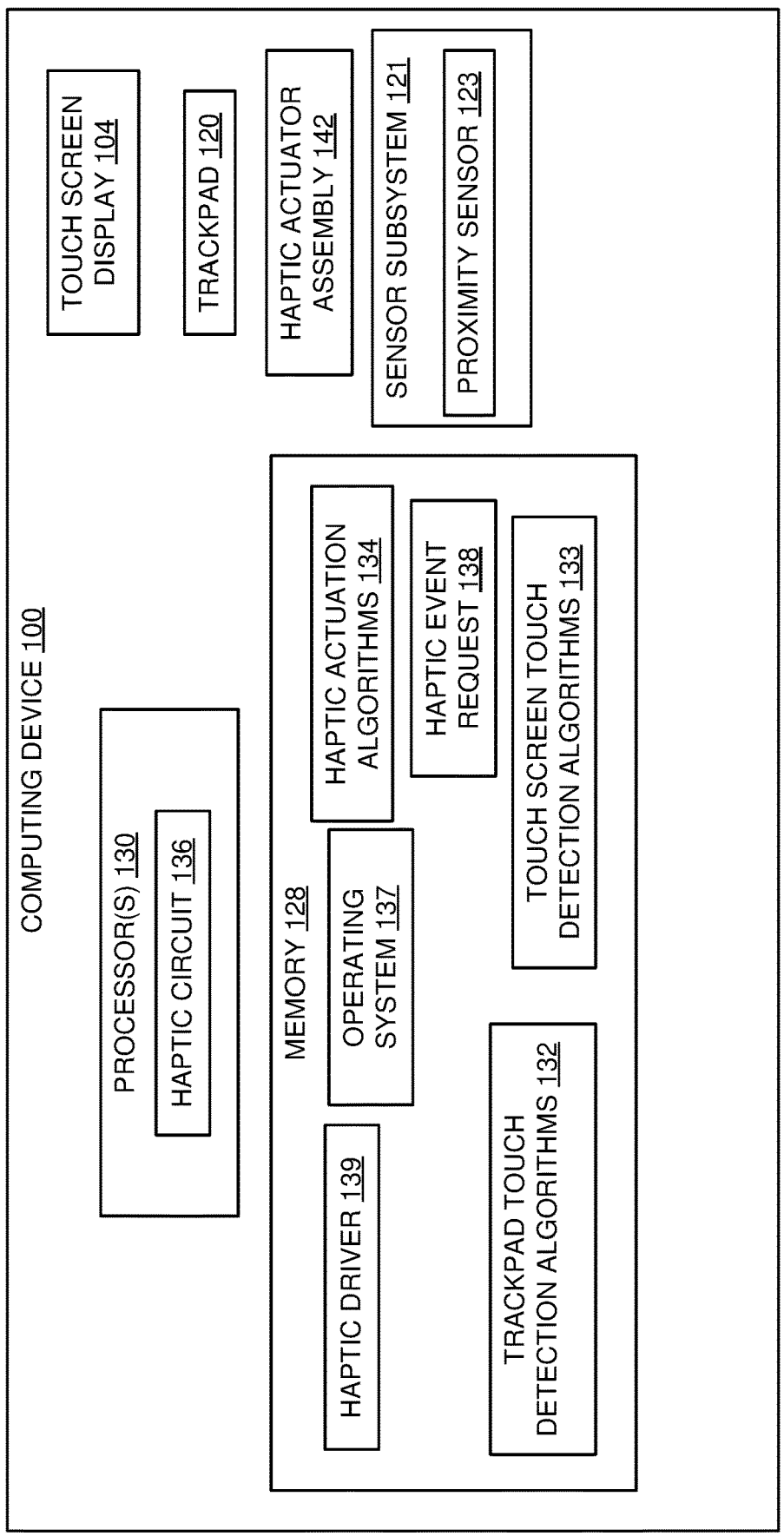
FIG. 3 shows a schematic view of components of the computing device of FIG. 1 according to examples of the present disclosure.

With reference now to FIG. 3, a schematic view of components of the example computing device of FIG. 1 is provided. Computing device 100 includes memory 128 that stores instructions executable by a processor 130. For example, the memory 128 stores instructions in the form of trackpad touch detection algorithms 132 executable by the processor 130 to perform touch detection on the trackpad 120 using signals received from the trackpad. Similarly, memory 128 stores instructions in the form of touch screen touch detection algorithms 133 executable by the processor 130 to perform touch detection on the touch screen display 104 using signals received from the touch screen display. Additionally, and as described in more detail below, memory 128 stores instructions in the form of haptic actuation algorithms 134 executable by the processor 130 to receive and process haptic event requests 138, determine whether the trackpad 120 is in use, and selectively cause driver signals to be sent to a haptic actuator assembly 142 of the computing device 100. In some examples the processor 130 includes a haptic circuit 136 configured to execute a haptic driver 139 that controls activation of the haptic actuator assembly 142. Additional details regarding processor 130, memory 128, and other components and subsystems of computing device 100 are described further below with reference to FIG. 10.

As noted above, some devices include a trackpad that is mechanically coupled to a moveable mass that is configured to generate vibrations in the trackpad. For example, in some devices one or more linear resonant actuators (LRAs) are physically connected to the trackpad and configured to vibrate the trackpad to provide haptic feedback to a user. However, these configurations increase material costs and consume valuable packaging space within the structure containing the trackpad.

Accordingly, and in one potential advantage of the present disclosure, configurations of the present disclosure include a haptic actuator assembly comprising at least one conductive coil formed on or affixed to the printed circuit board of the trackpad, and at least one magnet rigidly affixed to the chassis of the computing device and spaced from and not mechanically coupled to the conductive coil(s). Advantageously, and as described in more detail below, in these configurations the haptic actuator assembly is configured to produce user-perceptible vibrations in the chassis beyond the trackpad.

Figure 4:
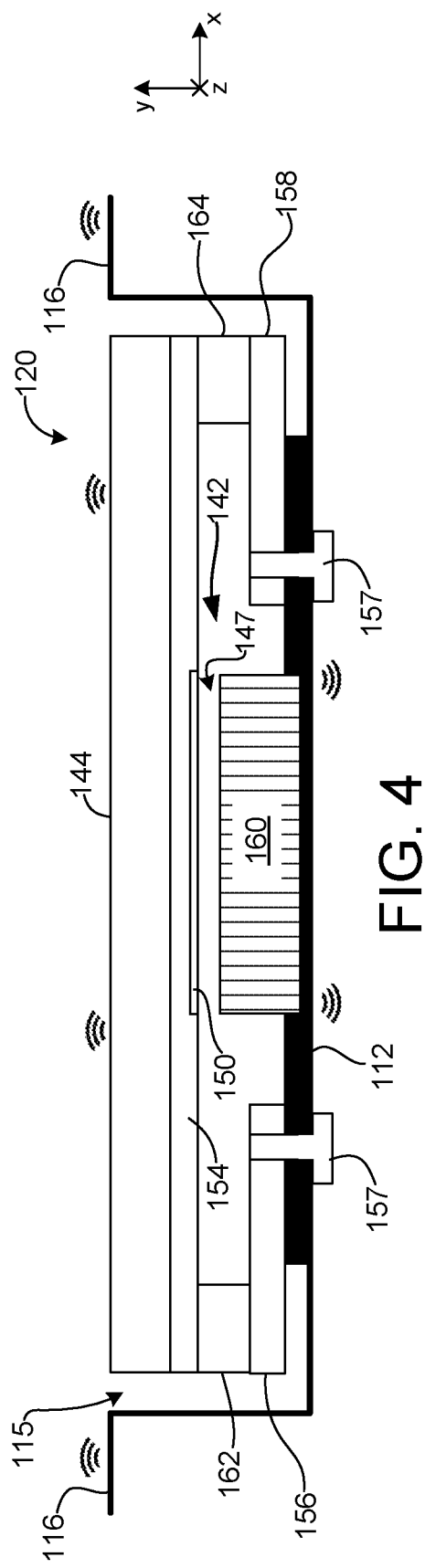
FIG. 4 shows a schematic view of components of the trackpad and haptic actuator assembly of the computing device of FIG. 1 according to examples of the present disclosure.
Figure 5:
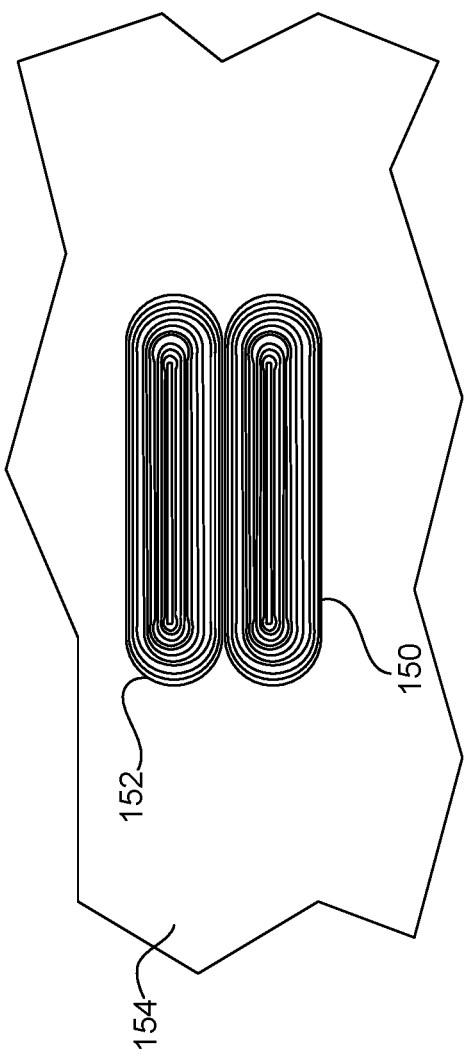
FIG. 5 shows a partial schematic view of two conductive coils located in a printed circuit board of the haptic actuator assembly of FIG. 4 according to examples of the present disclosure.

With reference now to FIGS. 4 and 5, in one example computing device 100 includes a trackpad 120 and haptic actuator assembly 142. The trackpad 120 includes a touch-receiving surface 144, such as a glass layer. Beneath the touch-receiving surface 144 is a printed circuit board 154 comprising driving and sensing electrodes as described above. In this example, the printed circuit board 154 is affixed to a first mounting plate 156 and second mounting plate 158 via a first spacer 162 and second spacer 164, respectively. In some examples, the first spacer 162 and second spacer 164 comprise a resilient, dampening material to mechanically isolate the trackpad 120 and dissipate the transmission of forces and other mechanical energy between the trackpad 120 and the chassis 112. For example, the first spacer 162 and second spacer 164 may comprise an elastomeric material, such as rubber or any other suitable material. The first mounting plate 156 and second mounting plate 158 are coupled to the chassis 112 by fasteners 157, such as screws.

With reference also to FIG. 5, the haptic actuator assembly 142 comprises a first conductive coil 150 and second conductive coil 152 that are formed on the printed circuit board 154. In other examples, the first conductive coil 150 and second conductive coil 152 may be discrete coil modules that are affixed to the surface of the printed circuit board 154. In other examples, a single conductive coil or three or more conductive coils may be utilized.

Each of the first conductive coil 150 and second conductive coil 152 is formed of a conductive material. Examples of conductive materials include various metals, such as aluminum, gold, silver, and copper. Each of the first conductive coil 150 and second conductive coil 152 in this example is planar in structure. More particularly, each coil is relatively thin as compared to its length and width to provide a relatively flat structure. In the present example, each of the first conductive coil 150 and second conductive coil 152 is formed by a conductive line tracing a planar spiral pattern with a progressively larger distance from the center portion of the coil to its outer edge.

The conductive coil(s) can be formed on the printed circuit board 154 in any suitable method, such as a masking technique, via deposition and etching of a conductive film on the printed circuit board, or via 3-dimensional printing techniques. In other examples, pre-formed conductive coils can be affixed to the printed circuit board 154 by any suitable method, including gluing.

As shown in FIG. 4, in this example the haptic actuator assembly 142 includes a magnet 160 that is rigidly affixed to the chassis 112 of the computing device 100. Additionally, the magnet 160 is spaced from and not mechanically coupled to the first conductive coil 150 and second conductive coil 152, thereby forming a gap 147 between the magnet and the coils and printed circuit board 154. In this configuration, the haptic circuit 136 executes the haptic driver 139 to provide current to the first conductive coil 150 and second conductive coil 152. Such current is controlled to generate electromagnetic fields that exert magnetic forces on the magnet 160 and corresponding forces on the first conductive coil 150 and second conductive coil 152 and attached printed circuit board 154 and touch-receiving surface 144 of the trackpad 120.

More particularly, these forces operate to vibrate the touch-receiving surface 144 laterally in the z-axis direction and thereby provide haptic feedback to one or more digits of a user contacting the touch-receiving surface. Additionally, and in one potential advantage of the present disclosure, by rigidly affixing the magnet 160 to the chassis 112, current supplied to the first conductive coil 150 and second conductive coil 152 generates corresponding forces on the magnet 160 that are transmitted through the chassis 112 to produce user-perceptible vibrations in the chassis beyond the trackpad 120. In different examples, the magnet 160 may be rigidly affixed to the chassis 112 via a press-fit engagement, one or more mechanical fasteners, a hard adhesive such as an epoxy, and/or other suitable methods that provide a rigid coupling.

Advantageously, by rigidly affixing the magnet 160 to chassis 112, the vibratory forces induced in magnet 160 are efficiently transmitted to the chassis and dampening and other energy transfer losses are reduced. In some examples, and as described in more detail below, a driver frequency of the driver signal provided to the first conductive coil 150 and second conductive coil 152 approximately matches a resonant frequency of the chassis 112. In this manner, the magnitude of vibrations induced in the chassis 112 may be increased.

Figure 6:
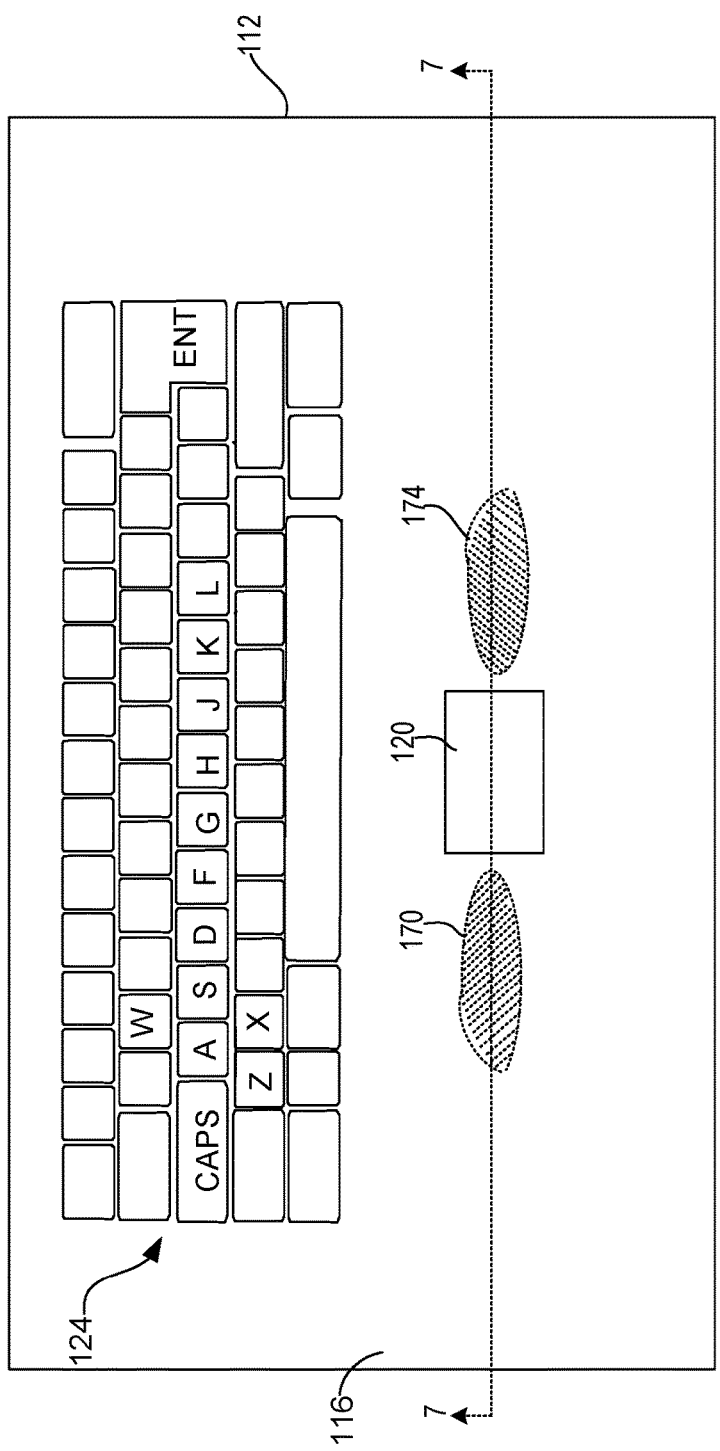
FIG. 6 schematically illustrates a user interaction surface of the computing device of FIG. 1 including palm rest areas.
Figure 7:
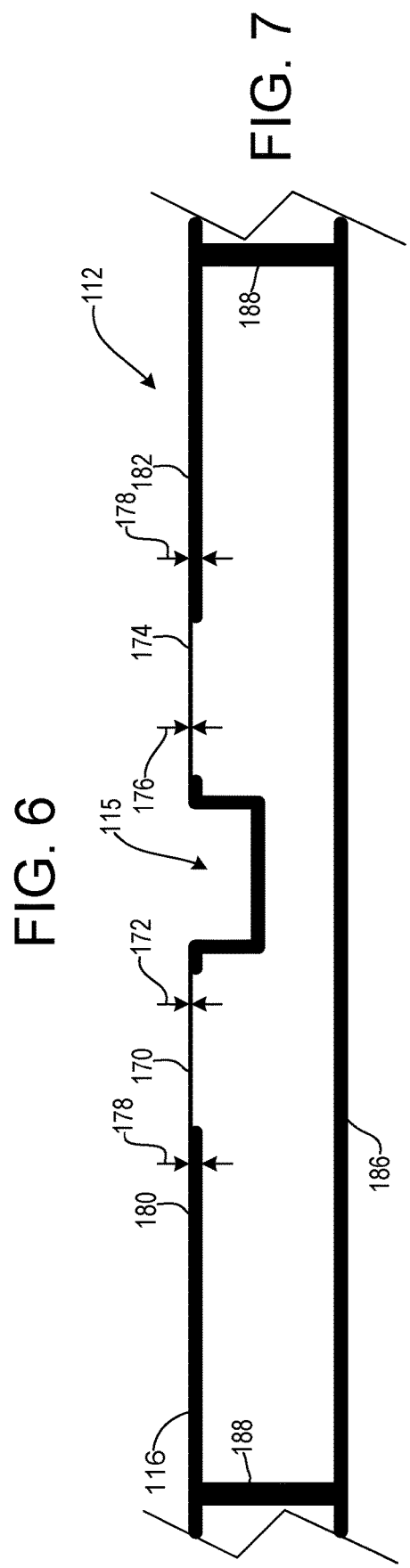
FIG. 7 is a schematic cross section of the computing device of FIG. 6 taken along line 7-7.

With reference now to FIGS. 6 and 7, in some examples the user interaction surface 116 of chassis 112 includes one or more portions having a wall thickness that is thinner than other portions of the chassis. For example and as described in more detail below, palm rest areas where a user places their palms when using the keyboard may have thinner wall thicknesses than surrounding portions of the chassis. In this manner, vibrations propagating from the magnet 160 through the chassis 112 will have a greater amplitude in these thin-walled portion(s).

FIG. 6 shows the user interaction surface 116 of chassis 112 comprising a left palm rest area 170 and a right palm rest area 174. In this example, the left palm rest area 170 and right palm rest area 174 each have irregular oval shapes that approximate the surface area of the user interaction surface 116 contacted by a user's left and right palm, respectively, when the user is interacting with the keyboard 124. For example, in laptop gaming a user's left-hand palm often rests on the chassis in approximately the left palm rest area 170 to keep the user's left-hand fingers positioned near the keys on the left side of keyboard 124 for gaming control (e.g., "W", "S", "A", and "D" keys control direction of movement in many games). The user's right hand may rest in the right palm rest area 174 or may manipulate a mouse. In FIG. 6 the left palm rest area 170 and right palm rest area 174 are shown with cross-hatching for descriptive purposes to indicate their locations. It will be appreciated that the left palm rest area 170 and right palm rest area 174 may not be visible to the end user. Additionally, in other examples the left palm rest area 170 and right palm rest area 174 may have other shapes and/or sizes.

FIG. 7 shows a schematic cross section of a portion of the chassis 112 through cross section line 7-7 in FIG. 6. In FIG. 7, the recessed portion 115 of chassis 112 in which the trackpad and haptic actuator assembly components are located is illustrated, and these components are not shown for ease of description. As shown in FIG. 7, the left palm rest area 170 has a first thickness 172 that is less than a third thickness 178 of a portion 180 of the chassis 112 that is adjacent to the left palm rest area. Similarly, the right palm rest area 174 has a second thickness 176 that is less than the third thickness 178 of a portion 182 of the chassis 112 that is adjacent to the right palm rest area. In the present example, the first thickness 172 and second thickness 176 are approximately equal. In other examples, the first thickness 172 and second thickness 176 may be different.

Accordingly, and in one potential advantage of the present disclosure, with this configuration driver signals sent to the first conductive coil 150 and second conductive coil 152 cause the magnet 160 to produce user-perceptible vibrations at the left palm rest area 170 and the right palm rest area 174 of the chassis 112 having greater magnitudes as compared to the surrounding thicker portions of the chassis. In this manner, these thinner palm rest areas may receive and transmit a greater variety of vibrational frequencies as well as higher amplitude vibrations as compared to the thicker chassis portions that exhibit greater damping and energy loss behavior and are too stiff to be excited at lower driving frequencies. By contrast, the thinner wall sections of the palm rest areas are easily excited with relatively lower driving frequencies and are vibrated with the greatest amplitude at their resonance frequency.

In some examples, the left palm rest area 170 and the right palm rest area 174 are fabricated from a less stiff material as compared to the material used in other portions of the chassis 112, such as portion 180 and portion 182. In this manner the more flexible palm rest areas exhibit more pronounced vibrations as compared to the stiffer surrounding chassis portions. In one example, the left palm rest area 170 and the right palm rest area 174 comprise a plastic insert, while portion 180 and portion 182 of chassis 112 are fabricated from a stiffer metal, such as an aluminum alloy. In another example, the left palm rest area 170 and the right palm rest area 174 are fabricated from magnesium, while the other portions of chassis 112 are fabricated from aluminum.

As shown in the example of FIG. 7, below the left palm rest area 170 and right palm rest area 174 is open space, as opposed to one or more support structures connecting these areas to the rear cover 186 below. By not including a support or other structure that directly connects the left palm rest area 170 and right palm rest area 174 to the rear cover 186, these areas are less constrained and more capable of receiving and transmitting vibrations received from the haptic actuator assembly 142. Additionally, and as shown in FIG. 7, in some examples support ribs 188 that extend between the user interaction surface 116 and the rear cover 186 are located substantially distanced from the left palm rest area 170 and right palm rest area 174. In this manner, any vibration dampening effects of the support ribs 188 are reduced, and the left palm rest area 170 and right palm rest area 174 are provided greater freedom to vibrate.

In some examples when the rear cover 186 of computing device 100 is resting on a surface, such as a wooden or glass table or other relatively hard surface, vibrations generated by the haptic actuator assembly 142 cause the rear cover to vibrate against the surface and produce an audible noise, such as a buzzing sound. In these examples, and in another potential advantage of the present disclosure, the computing device can provide audible notifications, experiences, game effects, and other feedback to a user. For example, this type of audible notification may be produced when an instant message or a video chat request is received. To facilitate such audible feedback, the rear cover 186 is rigidly affixed to the user interaction surface 116 and/or other portions of the chassis 112 to effectively receive vibrations transmitted from the haptic actuator assembly 142.

With the present configurations, and as described in more detail below, user-perceptible device-level haptic output can be provided to users to communicate a variety of information, notifications, experiences, game effects, and other feedback. However, and as noted above, providing haptic feedback to a user by actuating a trackpad's haptic components while the user is interacting with the trackpad can disrupt the user's engagement with the trackpad and possibly confuse the user with respect to the purpose or intention of the haptic feedback.

Figure 9A:
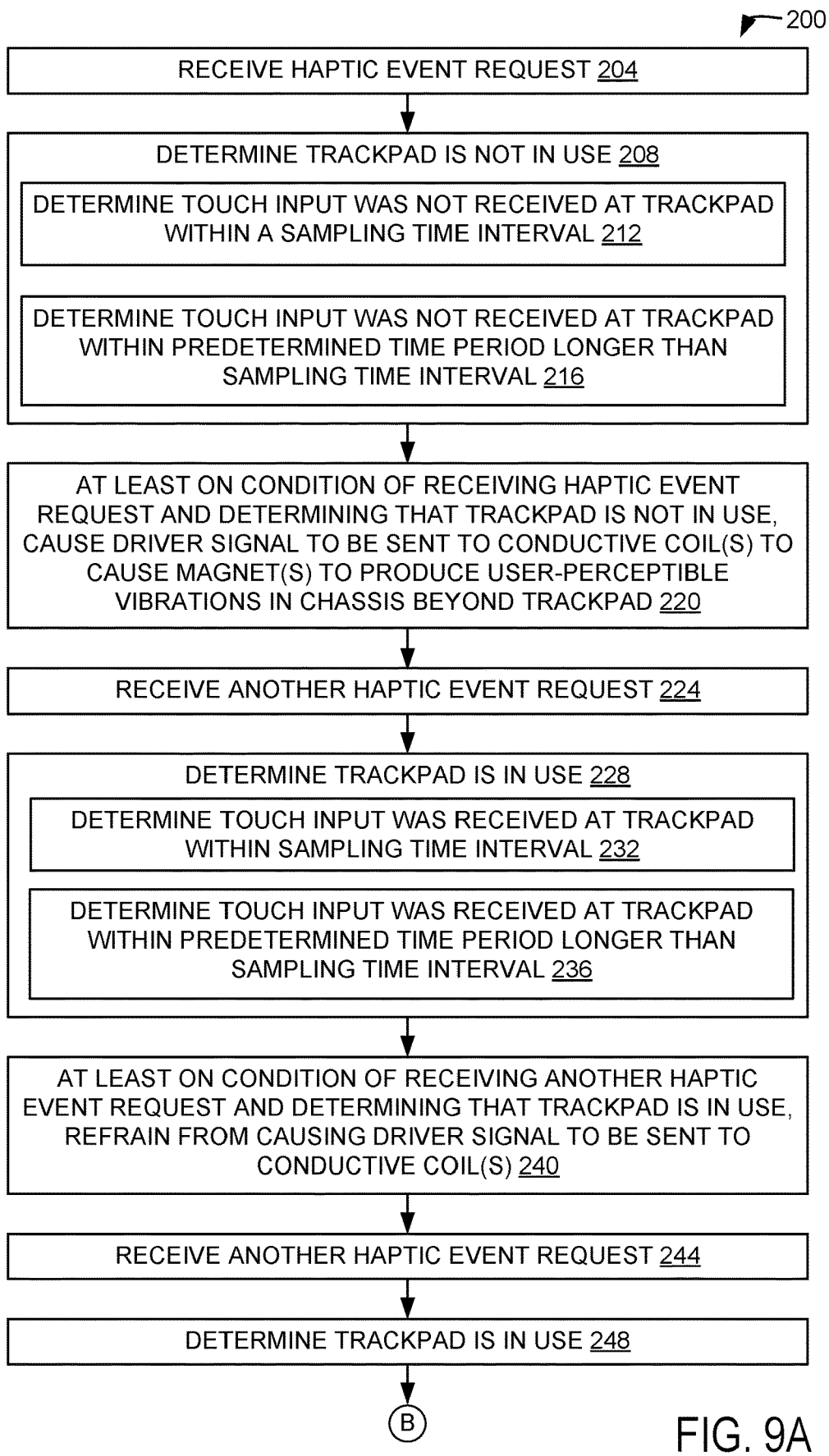
FIGS. 9A and 9B show a flow diagram of an example method for producing user-perceptible vibrations in the chassis of a computing device beyond a trackpad according to examples of the present disclosure.
Figure 9B:
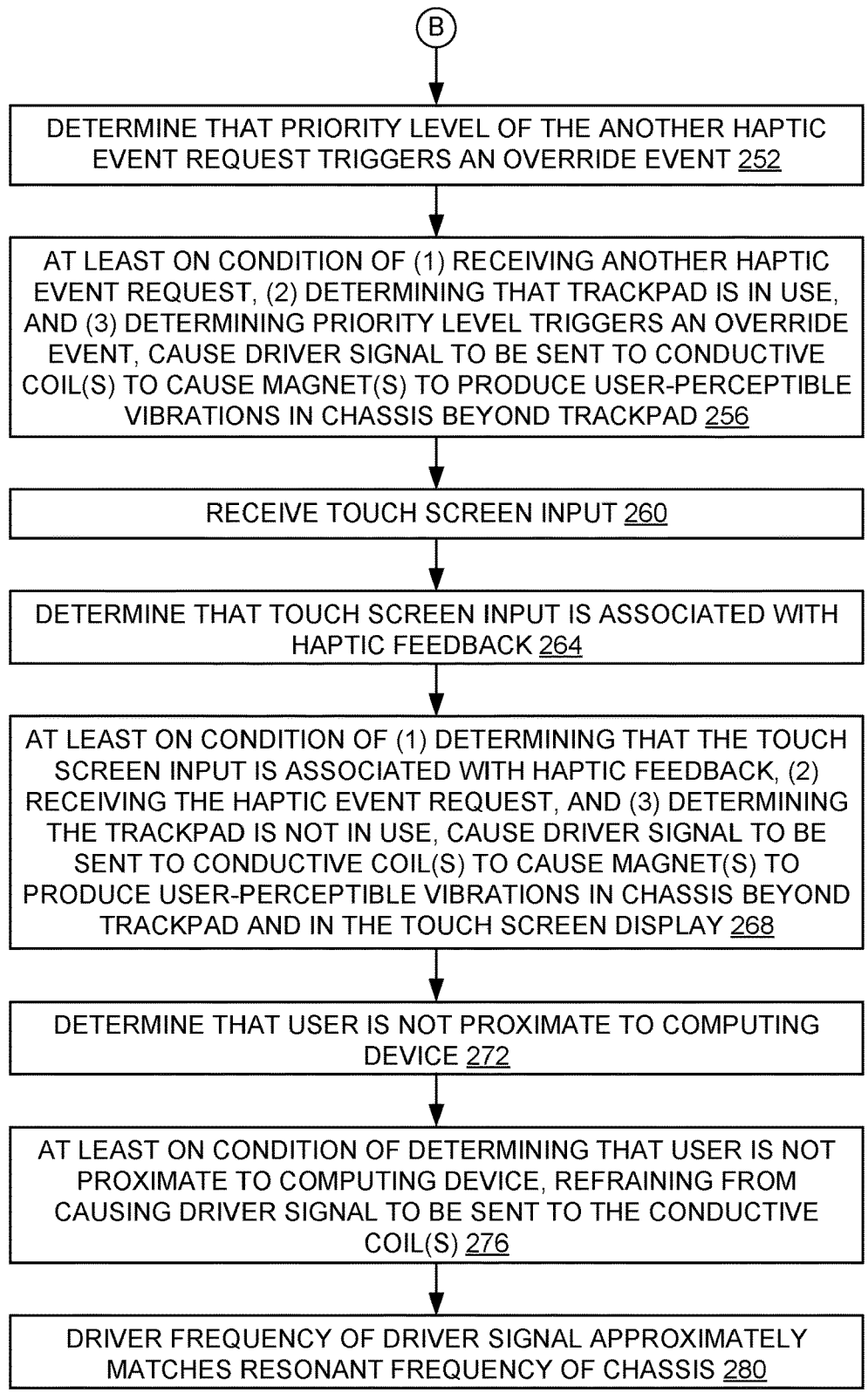

Accordingly, and in another potential advantage of the present disclosure, haptic actuation algorithms 134 are provided that selectively generate user-perceptible vibrations via the trackpad haptic actuator assembly 142 in a manner that avoids user confusion and disruption with trackpad engagements. With reference now to FIGS. 9A and 9B, an example method 200 for producing user-perceptible vibrations in the chassis 112 beyond the trackpad 120 will now be described.

FIGS. 9A and 9B depict a flowchart illustrating the method 200. The following description of method 200 is provided with reference to the software and hardware components described herein and shown in FIGS. 1-8 and 10. For example, the method 200 may be performed by the computing device 100, hardware, software, and/or firmware of the computing device 100.

It will be appreciated that following description of method 200 is provided by way of example and is not meant to be limiting. Therefore, it is to be understood that method 200 may include additional and/or alternative steps relative to those illustrated in FIGS. 9A and 9B. Further, it is to be understood that the steps of method 200 may be performed in any suitable order. Further still, it is to be understood that one or more steps may be omitted from method 200 without departing from the scope of this disclosure. It will also be appreciated that method 300 also may be performed in other contexts using other suitable components.

With reference to FIG. 9A, at 204 the method 200 includes receiving a haptic event request 138. In some examples, a haptic event request 138 may be generated in response to detecting a hardware change or status in computing device 100. Examples of hardware changes/statuses may include, but are not limited to, unplugging a power supply unit from a power source, a low battery condition, docking or undocking of a stylus to or from the computing device, components connected to or disconnected from the computing device, Bluetooth, WiFi or other communication protocol connection status, device posture or orientation change, and biometric sensor sign-in/sign-off/incorrect match.

In other examples, a haptic event request 138 may be generated by an operating system or an application such as a game that is executing locally on computing device 100 or remotely at another computing device. In these examples, an operating system 137 running on computing device 100 may receive and process the haptic event request 138. Examples of operating system-triggered haptic events may include, but are not limited to, pop-up displays of alert windows, notifications such as computer restart alerts and content deletion warnings, notifications of receipt of a message via a communication platform or application, reminders, detection of viruses, etc. Examples of application-triggered haptic events may include, but are not limited to, game interactions, experiences, and feedback, such as contact with another player (e.g., in contact sport games such as soccer), level changes, rewards generated, etc., heart beating, shooting a weapon, explosions, etc., In other examples, and as described in more detail below, a haptic event request 138 may be triggered via a touch screen input received at the touch screen display 104. In these examples, and utilizing the configurations described above, a driver signal is sent to the conductive coil(s) to cause the magnet to produce user-perceptible vibrations in the chassis beyond the trackpad and in the touch screen display 104. In this manner, the user can feel these vibrations via their finger(s) touching the touch screen display 104 or through a stylus touching the display.

With reference again to FIG. 9A, at 208 the method 200 includes determining that the trackpad 120 is not in use. As noted above, actuating a trackpad's haptic components while a user is interacting with the trackpad can disrupt the user's interactions with the trackpad and confuse the user with respect to the purpose or intention of the haptic feedback. Accordingly, and in one potential advantage of the present disclosure, the haptic actuation algorithms 134 selectively generate user-perceptible vibrations via the trackpad haptic actuator assembly 152 in a manner that avoids user confusion and disruption with trackpad engagements. More particularly and in some examples, before actuating the trackpad haptic actuator assembly 152, the haptic actuation algorithms 134 determines whether a user is actively using the trackpad 120. As described in more detail below and to avoid user disruption and confusion, when the haptic actuation algorithms 134 determine that a user is actively using the trackpad 120, the algorithms may refrain from sending driver signals to the conductive coil(s) that would actuate the trackpad haptic actuator assembly 152.

In some examples, at 212 the method 200 includes determining that the trackpad 120 is not in use by determining that a touch input was not received at the trackpad within a sampling time interval. For example, the trackpad touch detection algorithms 132 may sample or scan the trackpad electrodes at a scanning frequency to detect user inputs. In different examples, the scanning frequency may be between approximately 50 Hz (i.e., 20 ms sampling time interval) and approximately 1000 Hz (i.e., 1 ms sampling time interval). In one example, the scanning frequency may be 100 Hz (i.e., 10 ms sampling time interval). In this example, after receiving a haptic event request the haptic actuation algorithms 134 determine that a touch input was not received within the most recent sampling time interval; e.g., within the prior 10 ms.

Returning to FIG. 9A, at 220 the method 200 includes, at least on condition of receiving the haptic event request and determining that the trackpad is not in use, causing a driver signal to be sent to at least one conductive coil to cause at least one magnet to produce user-perceptible vibrations in the chassis beyond the trackpad. Accordingly, and as noted above, by selectively generating user-perceptible vibrations via the trackpad haptic actuator assembly 152 on the condition that the trackpad is not in use, the haptic actuation algorithms can provide device-wide haptic feedback while avoiding user confusion and disruption with trackpad engagements.

In other examples, at 216 the method 200 includes determining that the trackpad is not in use by determining that a touch input was not received at the trackpad within a predetermined time period longer than a sampling time interval. In one example, where the scanning frequency is 200 Hz (i.e., 5 ms sampling time interval), a predetermined time period longer than the sampling time interval is 1 second. In this example, after receiving a haptic event request the haptic actuation algorithms 134 determine that a touch input was not received within the predetermined time period; e.g., within the prior 1 second. In this example, at least on condition of receiving the haptic event request and determining that touch input was not received within the predetermined time period (e.g., the trackpad is not in use), a driver signal is sent to at least one conductive coil to cause at least one magnet to produce user-perceptible vibrations in the chassis beyond the trackpad. In other examples, other predetermined time periods may be utilized, such as 0.5 seconds, 1.5 seconds, 5 seconds, and any other suitable predetermined time period.

In other examples where the trackpad is determined to be in use, the haptic actuation algorithms 134 refrain from actuating the trackpad haptic actuator assembly 152 to avoid user confusion and disruption with trackpad engagements. For example, at 224 the method 200 may include receiving another haptic event request. At 228 the method includes determining that the trackpad is in use. In some examples, at 232 the method 200 includes determining that the trackpad 120 is in use by determining that a touch input was received at the trackpad within a sampling time interval, as described above. In other examples, at 236 the method 200 includes determining that the trackpad 120 is in use by determining that a touch input was received at the trackpad within a predetermined time period longer than a sampling time interval, as described above.

At 240 the method 200 includes, at least on condition of receiving the haptic event request and determining that the trackpad is in use, refraining from causing the driver signal to be sent to the at least one conductive coil. Accordingly, and as noted above, when the trackpad is in use the haptic actuation algorithms 134 refrain from actuating the trackpad haptic actuator assembly 152 to avoid user confusion and disruption with trackpad engagements.

In some examples, the trackpad touch detection algorithms 132 include a palm detection algorithm that determines when touch detection signals likely correspond to the palm of a user's hand, thereby indicating that the user's palm is resting on the trackpad 120 and suggesting that the user is actively using the keyboard 124 or otherwise engaging with the computing device 100. Similar to the example of determining that the trackpad is in use as described above, in some examples when a haptic event request is received and the palm detection algorithm determines that a user's palm is contacting the trackpad 120, the haptic actuation algorithms 134 refrain from causing a driver signal to be sent to the at least one conductive coil to avoid user confusion and disruption with computing device engagements.

In some situations where a user is actively using the trackpad, the urgency or other priority of a haptic event request can supersede the potential for user confusion and disruption with trackpad engagements. For example, it may be desirable to actuate the trackpad haptic actuator assembly 142 to notify a user of a critically low battery condition of the computing device 100, even when the user is actively using the trackpad 120. Accordingly, in some examples each different haptic event request 138 may be assigned to one of a plurality of priority levels that corresponds to its degree of urgency. Based on the priority level of a given haptic event request 138, an override condition may be triggered that causes actuation of the trackpad haptic actuator assembly 142, even when the trackpad 120 is currently in use.

For example and with reference again to FIG. 9A, at 244 the method 200 includes receiving another haptic event request. At 248 the method 200 includes determining that the trackpad is in use (as described above). With reference now to FIG. 9B, at 252 the method 200 includes determining that a priority level of the haptic event request triggers an override condition. At 256 the method 200 includes, at least on condition of (1) receiving the another haptic event request, (2) determining that the trackpad is in use, and (3) determining that the priority level of the another haptic event request triggers the override condition, causing the driver signal to be sent to the at least one conductive coil to cause the at least one magnet to produce user-perceptible vibrations in the chassis beyond the trackpad. In this manner, and in another potential advantage of the present disclosure, a user can be selectively alerted to important information, notifications, device conditions and statuses, etc., via the trackpad haptic actuator assembly, even when the user is actively using the trackpad.

Similarly, in some examples where a palm detection algorithm determines that a user's palm is contacting the trackpad 120, the urgency or other priority of a haptic event request can supersede the potential for user confusion and disruption with computing device engagements. In these examples, at least on condition of (1) receiving another haptic event request, (2) determining that a user's palm is contacting the trackpad, and (3) determining that the priority level of the haptic event request triggers the override condition, the haptic actuation algorithms 134 cause the driver signal to be sent to the conductive coil(s) to cause the magnet to produce user-perceptible vibrations in the chassis beyond the trackpad.

In different examples, the priority level and corresponding urgency of haptic event requests 138 may be evaluated and determined in a variety of manners. In one example, each different haptic event request 138 is assigned a priority level between 1 and 3, with 1 being the least urgent and 3 being the most urgent. In this example, haptic event requests having a priority level of 3 trigger an override condition that causes actuation of the trackpad haptic actuator assembly 142, even where the trackpad 120 is currently in use. By contrast, haptic event requests having a priority level of 1 or 2 do not trigger an override condition, such that the trackpad haptic actuator assembly 142 is not actuated when the trackpad 120 is in use. In other examples, any suitable number of priority levels and different override condition triggering thresholds may be utilized. Further, in other examples any other suitable schema and/or methods for assigning priorities to different haptic event requests and comparing such priorities to override condition triggering thresholds may be utilized.

Figure 8:
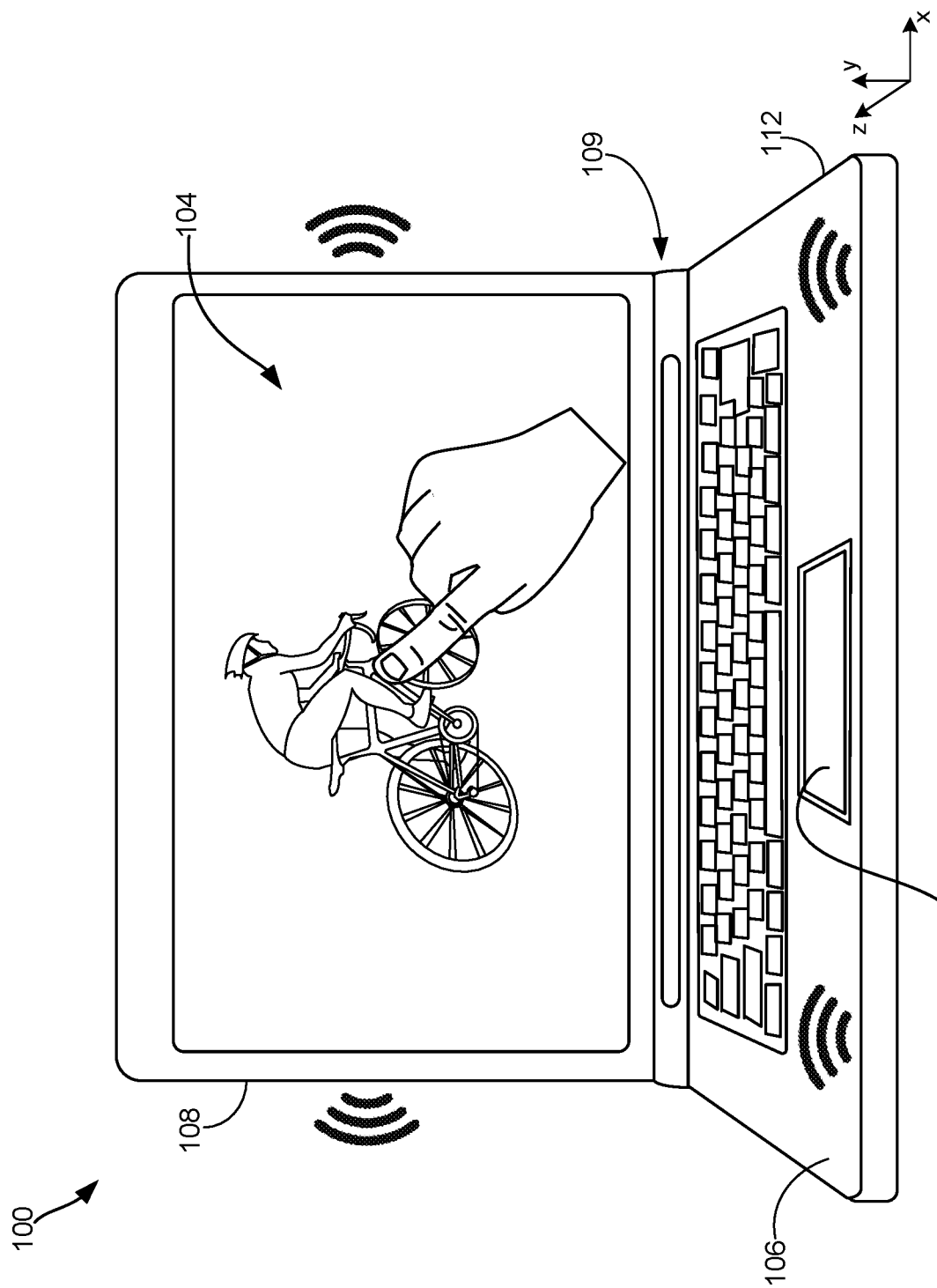
FIG. 8 schematically shows the touch screen display of the computing device of FIG. 1 vibrating via the haptic actuator assembly according to examples of the present disclosure.

In the example of FIG. 1 and with reference also to FIG. 8, computing device 100 includes a touch screen display 104 that is rotatably coupled to chassis 112 via hinge 109 in a rigid manner that efficiently propagates vibrations from the chassis to the display. Also and as noted above, in some examples a haptic event request 138 may be triggered via a touch screen input received at the touch screen display 104. In these examples, and utilizing the configurations described above, a driver signal is sent to the conductive coil(s) to cause the magnet to produce user-perceptible vibrations in the chassis beyond the trackpad and in the touch screen display 104. For example, the hinge 109 may comprise metallic components that rotatably couple the touch screen display 104 to chassis 112 and efficiently transfer vibrational energy from the chassis to the display. In this manner, the user can feel these vibrations via their finger(s) touching the touch screen display 104 or through a stylus touching the display.

With reference again to FIG. 9B, at 260 the method 200 includes receiving a touch screen input at the touch screen display 104. At 264 the method 200 includes determining that the touch screen input is associated with haptic feedback. In some examples, the touch screen touch detection algorithms 133 may analyze the touch screen input to determine whether the input is associated with haptic feedback. For example, gestures that correspond to certain user inputs, such as tabbing, scrolling, swiping to select, dragging, and snapping content, may be associated with haptic feedback. Where the system determines that touch screen input is associated with haptic feedback, a haptic event request may be sent to the haptic actuation algorithms 134.

At 268 the method 200 includes, at least on condition of (1) determining that the touch screen input is associated with haptic feedback, (2) receiving the haptic event request, and (3) determining that the trackpad is not in use, causing the driver signal to be sent to the conductive coil(s) to cause the magnet to produce user-perceptible vibrations in the chassis beyond the trackpad and in the touch screen display. Accordingly, and in another potential advantage of the present disclosure, user-perceptible haptic feedback generated by the haptic actuator assembly 142 associated with the trackpad 120 may be provided to the user via the touch screen display 104.

In some examples and at 272 the method 200 includes determining that a user is not proximate to the computing device 100. And at 276 the method 200 includes, at least on condition of determining that the trackpad is not in use and that the user is not proximate to the computing device, refraining from causing the driver signal to be sent to the conductive coil(s). In some examples, the computing device 100 may include a sensor subsystem 121 that comprises one or more proximity sensors 123. Signals from the proximity sensor(s) 123 may be analyzed to determine whether a user is proximate to the computing device. In some examples, a user is proximate to the computing device when the user is determined to be located within a predetermined distance of the computing device, such as one meter (or other suitable distance). In different examples the one or more proximity sensors 123 may include, but are not limited to, cameras, light sensors, and sonic sensors.

In these examples, by determining that a user is not proximate to the computing device 100 and correspondingly refraining from actuating the haptic actuator assembly 142, the system may avoid unnecessary haptic feedback and thereby conserve computing device resources, such as battery power.

Returning to FIG. 9B, in some examples at 280 the method 200 includes wherein a driver frequency of the driver signal that is sent to the conductive coil(s) approximately matches a resonant frequency of the chassis 112. In this manner, the magnitude of vibrations induced in the chassis 112 and touch screen display 104 may be increased, thereby more effectively communicating haptic feedback to the user.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
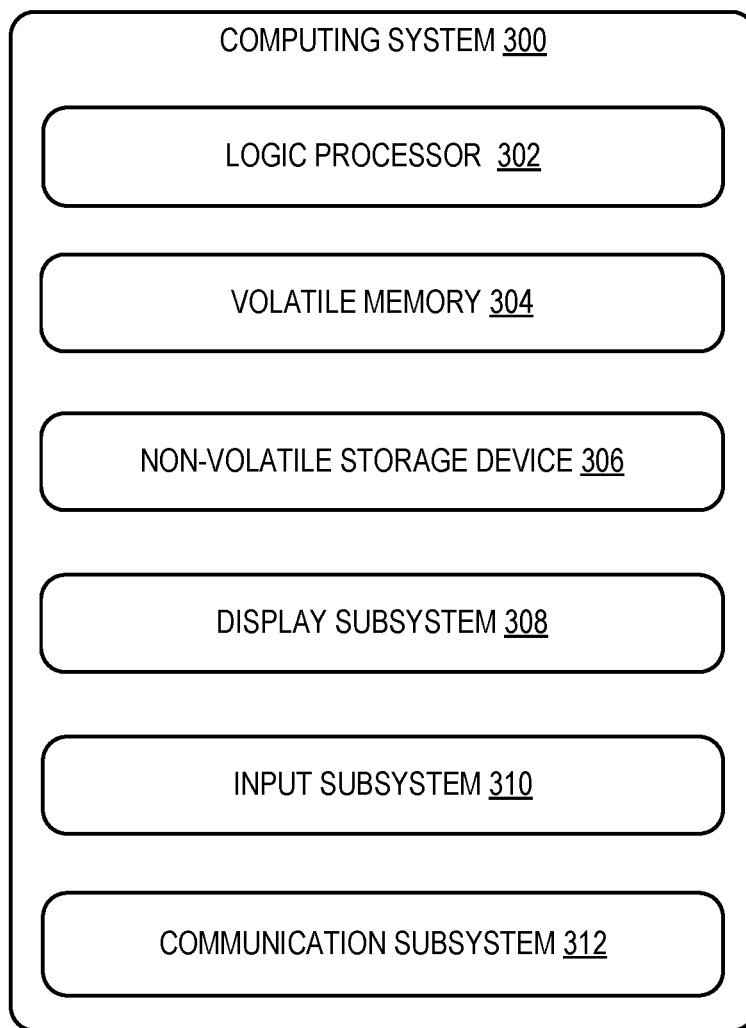
FIG. 10 shows a block diagram of an example computing system according to examples of the present disclosure.

FIG. 10 schematically shows a non-limiting embodiment of a computing system 300 that can enact one or more of the methods and processes described above. Computing system 300 is shown in simplified form. Computing system 300 may take the form of one or more personal computers, server computers, tablet computers, home-entertainment computers, gaming devices, mobile computing devices, mobile communication devices (e.g., smart phone), wearable computing devices, and/or other computing devices. The laptop computing device 100 described above may comprise computing system 300 or one or more aspects of computing system 300.

Computing system 300 includes a logic processor 302, volatile memory 304, and a non-volatile storage device 306. Computing system 300 may optionally include a display subsystem 308, input subsystem 310, communication subsystem 312, and/or other components not shown in FIG. 3.

Logic processor 302 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 304 may include physical devices that include random access memory (RAM). Volatile memory 304 is typically utilized by logic processor 302 to temporarily store information during processing of software instructions. It will be appreciated that volatile memory 304 typically does not continue to store instructions when power is cut to the volatile memory 304.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

Input subsystem 310 may comprise or interface with one or more user-input devices such as trackpad 120, keyboard 124, touch screen display 104, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as an HDMI over Wi-Fi connection. In some embodiments, the communication subsystem may allow computing system 300 to send and/or receive messages to and/or from other devices via a network such as the Internet.

The following paragraphs provide additional support for the claims of the subject application. One aspect provides, a computing device, comprising: a chassis comprising a trackpad, the trackpad comprising a printed circuit board; a haptic actuator assembly comprising: at least one conductive coil formed on or affixed to the printed circuit board of the trackpad; and at least one magnet rigidly affixed to the chassis of the computing device, the at least one magnet spaced from and not mechanically coupled to the at least one conductive coil; a processor; and a memory storing instructions executable by the processor to: receive a haptic event request; determine that the trackpad is not in use; and at least on condition of receiving the haptic event request and determining that the trackpad is not in use, cause a driver signal to be sent to the at least one conductive coil to cause the at least one magnet to produce user-perceptible vibrations in the chassis beyond the trackpad. The computing device may additionally or alternatively include, wherein determining that the trackpad is not in use comprises determining that a touch input was not received at the trackpad within a sampling time interval. The computing device may additionally or alternatively include, wherein determining that the trackpad is not in use comprises determining that a touch input was not received at the trackpad within a predetermined time period longer than a sampling time interval.

The computing device may additionally or alternatively include, wherein the instructions are executable to: receive another haptic event request; determine that the trackpad is in use; and at least on condition of receiving the another haptic event request and determining that the trackpad is in use, refrain from causing the driver signal to be sent to the at least one conductive coil. The computing device may additionally or alternatively include, wherein determining that the trackpad is in use comprises determining that a touch input was received at the trackpad within a sampling time interval. The computing device may additionally or alternatively include, wherein determining that the trackpad is in use comprises determining that a touch input was received at the trackpad within a predetermined time period longer than a sampling time interval. The computing device may additionally or alternatively include, wherein the instructions are executable to: receive another haptic event request; determine that the trackpad is in use or at least a portion of a palm is contacting the trackpad; determine that a priority level of the another haptic event request triggers an override condition; and at least on condition of (1) receiving the another haptic event request, (2) determining that the trackpad is in use or at least the portion of the palm is contacting the trackpad, and (3) determining that the priority level of the another haptic event request triggers the override condition, cause the driver signal to be sent to the at least one conductive coil to cause the at least one magnet to produce user-perceptible vibrations in the chassis beyond the trackpad. The computing device may additionally or alternatively include a touch screen display rotatably coupled to the chassis, and wherein the instructions are executable to: receive a touch screen input; determine that the touch screen input is associated with haptic feedback; and at least on condition of (1) determining that the touch screen input is associated with the haptic feedback, (2) receiving the haptic event request, and (3) determining that the trackpad is not in use, cause the driver signal to be sent to the at least one conductive coil to cause the at least one magnet to produce user-perceptible vibrations in the chassis beyond the trackpad and in the touch screen display. The computing device may additionally or alternatively include, wherein the instructions are executable to: determine that a user is not proximate to the computing device; and at least on condition of determining that the trackpad is not in use and that the user is not proximate to the computing device, refrain from causing the driver signal to be sent to the at least one conductive coil.

Another aspect provides In a computing device comprising (1) a chassis including a trackpad that comprises a printed circuit board, and (2) a haptic actuator assembly comprising at least one conductive coil formed on or affixed to the printed circuit board of the trackpad and at least one magnet rigidly affixed to the chassis, the at least one magnet spaced from and not mechanically coupled to the at least one conductive coil, a method for producing user-perceptible vibrations in the chassis beyond the trackpad, the method comprising: receiving a haptic event request; determining that the trackpad is not in use; and at least on condition of receiving the haptic event request and determining that the trackpad is not in use, causing a driver signal to be sent to the at least one conductive coil to cause the at least one magnet to produce user-perceptible vibrations in the chassis beyond the trackpad. The method may additionally or alternatively include, wherein determining that the trackpad is not in use comprises determining that a touch input was not received at the trackpad within a sampling time interval. The method may additionally or alternatively include, wherein determining that the trackpad is not in use comprises determining that a touch input was not received at the trackpad within a predetermined time period longer than a sampling time interval. The method may additionally or alternatively include, receiving another haptic event request; determining that the trackpad is in use; and at least on condition of receiving the another haptic event request and determining that the trackpad is in use, refraining from causing the driver signal to be sent to the at least one conductive coil.

The method may additionally or alternatively include, wherein determining that the trackpad is in use comprises determining that a touch input was received at the trackpad within a sampling time interval. The method may additionally or alternatively include, wherein determining that the trackpad is in use comprises determining that a touch input was received at the trackpad within a predetermined time period longer than a sampling time interval. The method may additionally or alternatively include, receiving another haptic event request; determining that the trackpad is in use or at least a portion of a palm is contacting the trackpad; determining that a priority level of the another haptic event request triggers an override condition; and at least on condition of (1) receiving the another haptic event request, (2) determining that the trackpad is in use or the portion of the palm is contacting the trackpad, and (3) determining that the priority level of the another haptic event request triggers the override condition, causing the driver signal to be sent to the at least one conductive coil to cause the at least one magnet to produce user-perceptible vibrations in the chassis beyond the trackpad. The method may additionally or alternatively include, wherein the computing device further comprises a touch screen display rotatably coupled to the chassis, the method further comprising: receiving a touch screen input; determining that the touch screen input is associated with haptic feedback; and at least on condition of (1) determining that the touch screen input is associated with the haptic feedback, (2) receiving the haptic event request, and (3) determining that the trackpad is not in use, causing the driver signal to be sent to the at least one conductive coil to cause the at least one magnet to produce user-perceptible vibrations in the chassis beyond the trackpad and in the touch screen display. The method may additionally or alternatively include, determining that a user is not proximate to the computing device; and at least on condition of determining that the trackpad is not in use and that the user is not proximate to the computing device, refraining from causing the driver signal to be sent to the at least one conductive coil. The method may additionally or alternatively include, wherein a driver frequency of the driver signal approximately matches a resonant frequency of the chassis.

Another aspect provides a computing device, comprising: a chassis comprising a user interaction surface that comprises a left palm rest area having a first thickness, a right palm rest area having a second thickness, and a trackpad between the left palm rest area and the right palm rest area, the trackpad comprising a printed circuit board, wherein the first thickness of the left palm rest area and the second thickness of the right palm rest area are both less than a third thickness of portions of the user interaction surface adjacent to the left palm rest area and the right palm rest area; a haptic actuator assembly comprising: at least one conductive coil formed on or affixed to the printed circuit board of the trackpad; and at least one magnet rigidly affixed to the chassis of the computing device, the at least one magnet spaced from and not mechanically coupled to the at least one conductive coil; a processor; and a memory storing instructions executable by the processor to: receive a haptic event request; determine that the trackpad is not in use; and at least on condition of receiving the haptic event request and determining that the trackpad is not in use, cause a driver signal to be sent to the at least one conductive coil to cause the at least one magnet to produce user-perceptible vibrations at least at the left palm rest area and the right palm rest area of the chassis.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a chassis comprising a user interaction surface and an opposing rear cover, the user interaction surface comprising and circumscribing a left palm rest area that is a first portion of the user interaction surface and has a first wall thickness, a right palm rest area that is a second portion of the user interaction surface and has a second wall thickness, and a trackpad between the left palm rest area and the right palm rest area, the trackpad comprising a printed circuit board, wherein the first wall thickness of the left palm rest area and the second wall thickness of the right palm rest area are both less than a third wall thickness of portions of the user interaction surface adjacent to the left palm rest area and the right palm rest area, wherein the left palm rest area and the right palm rest area have irregular oval shapes and the entire user interaction surface adjacent to the left palm rest area and the right palm rest area has the third wall thickness;
a haptic actuator assembly comprising:
at least one conductive coil formed on or affixed to the printed circuit board of the trackpad; and
at least one magnet rigidly affixed to the chassis of the computing device;
a processor; and
a memory storing instructions executable by the processor to:
receive a haptic event request; and
at least on condition of receiving the haptic event request, cause a driver signal to be sent to the at least one conductive coil to cause the at least one magnet to produce user-perceptible vibrations at least at the left palm rest area and the right palm rest area of the chassis.

2. The computing device of claim 1, wherein the first wall thickness and the second wall thickness are equal.

3. The computing device of claim 1, wherein the first wall thickness and the second wall thickness are different.

4. The computing device of claim 1, wherein the left palm rest area and the right palm rest area are fabricated from a less stiff material as compared to other material used in the portions of the user interaction surface adjacent to the left palm rest area and the right palm rest area.

5. The computing device of claim 1, wherein the left palm rest area and the right palm rest area comprise a plastic insert.

6. The computing device of claim 1, wherein the left palm rest area and the right palm rest area are fabricated from magnesium.

7. The computing device of claim 1, wherein a driver frequency of the driver signal approximately matches a resonant frequency of the chassis.

8. The computing device of claim 1, wherein the left palm rest area is a left planar palm rest area and the right palm rest area is a right planar palm rest area.

9. A computing device, comprising:
a chassis comprising a user interaction surface and an opposing rear cover, a left palm rest area that is a first portion of the user interaction surface and has a first wall thickness, a right palm rest area that is a second portion of the user interaction surface and has a second wall thickness equal to the first wall thickness, and a trackpad between the left palm rest area and the right palm rest area, the trackpad comprising a printed circuit board, wherein the first wall thickness of the left palm rest area and the second wall thickness of the right palm rest area are both less than a third wall thickness of portions of the user interaction surface adjacent to the left palm rest area and the right palm rest area, wherein the left palm rest area and the right palm rest area are fabricated from a less stiff material as compared to other material used in the portions of the user interaction surface adjacent to the left palm rest area and the right palm rest area, wherein the left palm rest area and the right palm rest area have irregular oval shapes and the entire user interaction surface adjacent to the left palm rest area and the right palm rest area has the third wall thickness;
a haptic actuator assembly comprising:
at least one conductive coil formed on or affixed to the printed circuit board of the trackpad; and
at least one magnet rigidly affixed to the chassis of the computing device;
a processor; and
a memory storing instructions executable by the processor to:
receive a haptic event request; and
at least on condition of receiving the haptic event request, cause a driver signal to be sent to the at least one conductive coil to cause the at least one magnet to produce user-perceptible vibrations at least at the left palm rest area and the right palm rest area of the chassis.

10. The computing device of claim 9, wherein the first wall thickness and the second wall thickness are different.

11. The computing device of claim 9, wherein the left palm rest area and the right palm rest area comprise a plastic insert.

12. The computing device of claim 9, wherein the left palm rest area and the right palm rest area are fabricated from magnesium.

13. The computing device of claim 9, wherein a driver frequency of the driver signal approximately matches a resonant frequency of the chassis.

14. The computing device of claim 9, wherein the left palm rest area is a left planar palm rest area and the right palm rest area is a right planar palm rest area.

15. A computing device, comprising:
a chassis comprising a user interaction surface that comprises a left palm rest area having a first wall thickness, a right palm rest area having a second wall thickness, and a trackpad between the left palm rest area and the right palm rest area, the trackpad comprising a printed circuit board, wherein the first wall thickness of the left palm rest area and the second wall thickness of the right palm rest area are both less than a third wall thickness of portions of the user interaction surface adjacent to the left palm rest area and the right palm rest area wherein the left palm rest area and the right palm rest area comprise a plastic insert, wherein the left palm rest area and the right palm rest area have irregular oval shapes and the entire user interaction surface adjacent to the left palm rest area and the right palm rest area has the third wall thickness;
a haptic actuator assembly comprising:
at least one conductive coil formed on or affixed to the printed circuit board of the trackpad; and
at least one magnet rigidly affixed to the chassis of the computing device;

a processor; and a memory storing instructions executable by the processor to:

receive a haptic event request; and at least on condition of receiving the haptic event request, cause a driver signal to be sent to the at least one conductive coil to cause the at least one magnet to produce user-perceptible vibrations at least at the left palm rest area and the right palm rest area of the chassis, wherein a driver frequency of the driver signal approximately matches a resonant frequency of the chassis.

16. The computing device of claim 15, wherein the first wall thickness and the second wall thickness are equal.

17. The computing device of claim 15, wherein the first wall thickness and the second wall thickness are different.

18. The computing device of claim 15, wherein the left palm rest area and the right palm rest area are fabricated from a less stiff material as compared to other material used in the portions of the user interaction surface adjacent to the left palm rest area and the right palm rest area.

19. The computing device of claim 15, wherein the left palm rest area and the right palm rest area are fabricated from magnesium.

20. The computing device of claim 15, wherein the left palm rest area is a left planar palm rest area and the right palm rest area is a right planar palm rest area.

* * * * *